United States Patent
Lee

(10) Patent No.: US 7,191,759 B2
(45) Date of Patent: Mar. 20, 2007

(54) INDUCTIVE SENSOR FOR VEHICLE ELECTRONIC THROTTLE CONTROL

(75) Inventor: Joong K. Lee, Chatham (CA)

(73) Assignee: KSR Industrial Corporation, Ridgetown (CA)

(*) Notice: Subject to any disclaimer, the term of this patent is extended or adjusted under 35 U.S.C. 154(b) by 109 days.

(21) Appl. No.: 11/102,046

(22) Filed: Apr. 8, 2005

(65) Prior Publication Data

US 2005/0223841 A1     Oct. 13, 2005

Related U.S. Application Data

(60) Provisional application No. 60/598,192, filed on Aug. 2, 2004, provisional application No. 60/561,065, filed on Apr. 9, 2004, provisional application No. 60/561,007, filed on Apr. 9, 2004.

(51) Int. Cl.
*F02D 9/02* (2006.01)
(52) U.S. Cl. ............. 123/399; 324/207.17; 324/207.25
(58) Field of Classification Search ................ 123/399; 324/207.17, 207.25
See application file for complete search history.

(56) References Cited

U.S. PATENT DOCUMENTS

| | | | |
|---|---|---|---|
| 3,662,257 A | 5/1972 | Fujiwara | |
| 3,777,255 A | 12/1973 | Young et al. | |
| 3,852,661 A | 12/1974 | Szabo et al. | |
| 4,005,396 A | 1/1977 | Fujiwara et al. | |
| 4,013,911 A | 3/1977 | Fujiwara et al. | |
| 4,071,818 A | 1/1978 | Krisst | |
| 4,080,592 A | 3/1978 | Zabler | |
| 4,156,192 A | 5/1979 | Schedrovitsky et al. | |
| 4,170,754 A | 10/1979 | Schmitz et al. | |
| 4,189,674 A | 2/1980 | Lathlaen | |
| 4,210,865 A | 7/1980 | Nikolaev et al. | |
| 4,401,986 A | 8/1983 | Trenkler et al. | |
| 4,560,930 A | 12/1985 | Kouno | |
| 4,584,577 A | 4/1986 | Temple | |
| 4,638,250 A * | 1/1987 | Shen-Orr et al. | 324/207.17 |
| 4,648,473 A | 3/1987 | Bergner | |
| 4,958,607 A | 9/1990 | Lundberg | |
| 5,117,319 A | 5/1992 | Tokunaga | |
| 5,233,882 A | 8/1993 | Byram et al. | |
| 5,592,082 A | 1/1997 | Kuriyama | |
| 5,972,420 A | 10/1999 | Saito et al. | |
| 6,011,389 A * | 1/2000 | Masreliez et al. | 324/207.17 |
| 6,018,318 A | 1/2000 | Schodlbauer | |
| 6,112,402 A | 9/2000 | Saito et al. | |
| 6,153,062 A | 11/2000 | Saito et al. | |

(Continued)

FOREIGN PATENT DOCUMENTS

EP     0986731 A1     3/2000

(Continued)

*Primary Examiner*—Erick Solis
(74) *Attorney, Agent, or Firm*—Gifford, Krass, Sprinkle, Anderson & Citkowski, P.C.

(57) ABSTRACT

An apparatus for allowing electronic engine speed control comprises a transmitter coil, a receiver coil providing a receiver signal when the transmitter coil is excited due to an inductive coupling to the transmitter coil, and a coupler element mechanically associated with a pedal arm so that the coupler position is correlated with the pedal position. The coupler element modifies the inductive coupling between the transmitter coil and the receiver coil so that the receiver signal is correlated with the pedal arm position.

14 Claims, 2 Drawing Sheets

U.S. PATENT DOCUMENTS

| | | | |
|---|---|---|---|
| 6,166,535 A * | 12/2000 | Irle et al. | 324/207.25 |
| 6,201,465 B1 | 3/2001 | Saito et al. | |
| 6,255,810 B1 | 7/2001 | Irle et al. | |
| 6,329,813 B1 * | 12/2001 | Andermo | 324/207.17 |
| 6,341,426 B1 | 1/2002 | Okumura | |
| 6,369,564 B1 | 4/2002 | Khalfin et al. | |
| 6,384,597 B1 * | 5/2002 | Irle et al. | 324/207.17 |
| 6,384,598 B1 | 5/2002 | Hobein et al. | |
| 6,400,139 B1 | 6/2002 | Khalfin et al. | |
| 6,404,186 B1 | 6/2002 | Schodlbauer | |
| 6,412,364 B1 | 7/2002 | Berglar | |
| 6,466,889 B1 | 10/2002 | Schodlbauer | |
| 6,467,338 B1 | 10/2002 | Irle et al. | |
| 6,496,338 B2 | 12/2002 | Hasegawa et al. | |
| 6,518,749 B1 | 2/2003 | Oudet et al. | |
| 6,520,031 B2 * | 2/2003 | Madni et al. | 324/207.17 |
| 6,522,128 B1 | 2/2003 | Ely et al. | |
| 6,531,866 B2 | 3/2003 | Miyata et al. | |
| 6,534,970 B1 | 3/2003 | Ely et al. | |
| 6,541,960 B2 | 4/2003 | Nekado | |
| 6,549,004 B1 | 4/2003 | Prigge | |
| 6,552,533 B2 | 4/2003 | Schodlbauer et al. | |
| 6,584,428 B1 | 6/2003 | Irle et al. | |
| 6,615,155 B2 * | 9/2003 | Gilboa | 324/207.17 |
| 6,622,589 B1 | 9/2003 | Pino et al. | |
| 6,642,711 B2 * | 11/2003 | Kawate et al. | 324/207.17 |
| 2002/0040531 A1 | 4/2002 | Schodlbauer | |
| 2002/0171417 A1 | 11/2002 | Schodlbauer | |
| 2003/0137294 A1 | 7/2003 | Gleixner et al. | |
| 2003/0151402 A1 | 8/2003 | Kindler | |

FOREIGN PATENT DOCUMENTS

| | | |
|---|---|---|
| WO | WO 98/55828 A1 | 12/1998 |
| WO | WO 00/52425 A1 | 9/2000 |

* cited by examiner

Insert PCB containing Exciter/Receiver Coils

US 7,191,759 B2

INDUCTIVE SENSOR FOR VEHICLE ELECTRONIC THROTTLE CONTROL

REFERENCE TO RELATED APPLICATION

This application claims priority of U.S. Provisional Patent Application Ser. Nos. 60/561,065, filed Apr. 9, 2004; 60/561,007, filed Apr. 9, 2004; and 60/598,192, filed Aug. 2, 2004, the content of all of which are incorporated herein by reference.

FIELD OF THE INVENTION

The present invention relates to inductive sensors, in particular to a vehicle electronic throttle control using an inductive sensor.

BACKGROUND OF THE INVENTION

Motorized vehicles, such as automobiles, are provided with a user-operated control that controls engine speed. Typically, the user-operated control comprises a pedal arm having a foot pedal at a lower end of the pedal arm, typically referred to as an accelerator pedal. An accelerator pedal provides a throttle control signal that is transmitted from the accelerator pedal to an engine throttle control associated with the engine. Conventionally, there is a mechanical connection between accelerator pedal and the engine throttle control, and the throttle control signal is a mechanical signal. However, there has been a recent trend towards electronically controlled throttle control systems, sometimes termed fly-by-wire systems, in which the accelerator pedal or other user operated control is in electrical communication with the engine throttle control, the throttle control signal being an electronic signal. For commercial acceptability, such electronic throttle control systems should be reliable and not excessively expensive to manufacture.

SUMMARY OF THE INVENTION

An apparatus for allowing electronic engine speed control comprises a pedal arm pivotally attached to a pedal support, a transmitter coil, a receiver coil, providing a receiver signal when the transmitter coil is excited due to an inductive coupling, and a coupler element mechanically associated with the pedal arm so that the coupler position is correlated with the pedal position. The coupler element modifies the inductive coupling between the transmitter coil and the receiver coil so that the receiver signal is correlated with the pedal arm position. The pedal support may be a pedal housing, and may further include a mechanism for receiving a printed circuit board on which the transmitter and receiver coils are printed. The transmitter and receiver coils are disposed proximate to the coupler element, which may be attached to a distal end of the pedal arm. In this context, distal is from the viewpoint of an operator, and the proximal end may support a foot pedal. The transmitter coil and receiver coil may be substantially coplanar, for example being printed on the same surface of a board, or on different layers of the same board.

The coupler element can a metal plate attached to the pedal arm, the metal plate describing a generally circular path around a pedal rotation axis as the pedal is depressed. In other examples, the coupler element may comprise one or more conducting loops. A conducting loop can block flux in a similar manner to a similarly shaped conducting plate.

A receiver coil may be configured to comprise different portions having opposed sense of winding, for example anticlockwise and clockwise portions. The receiver coil can include a first loop configuration and a second loop configuration, flux coupling from the transmitter coil inducing a first voltage in the first loop configuration and a second voltage in the second loop configuration. If the first loop configuration and second loop configuration have different spatial extents, the modification of the flux coupling by the coupler element can change the ratio of the induced voltages in the two loop configurations.

The coupler element can be attached to the pedal arm on the opposite side of a pivotally attachment point of the pedal from the foot pedal, so that the coupler element is at a distal end of the pedal arm and the foot pedal is at a proximate end of the pedal arm. The coupler element may move along a circular arc as the foot pedal is depressed, for example about a central axis of the transmitter coil.

DETAILED DESCRIPTION OF THE INVENTION

An electronic throttle control according to an example of the present invention comprises a pedal arm mechanically associated with a position sensor, which senses the relative position of the pedal arm and transmits a signal to an engine throttle controller to control the engine speed. The position sensor is an inductive position sensor, comprising a transmitter coil, a receiver coil, and a coupler element which modifies inductive coupling between the transmitter coil and the receiver coil, so that a receiver signal induced in the receiver coil by the transmitter coil is correlated with the position of the coupler element. The position of the coupler element is determined by the position of the pedal position.

The coupler element may be a metal plate, other conducting plate, or other structure capable of modifying the inductive coupling between the transmitter coil and the receiver coil. In example of the present invention, the coupler element is a metal plate attached to the pedal arm. As the pedal arm pivots, the position of the coupler element changes.

Figure 1:
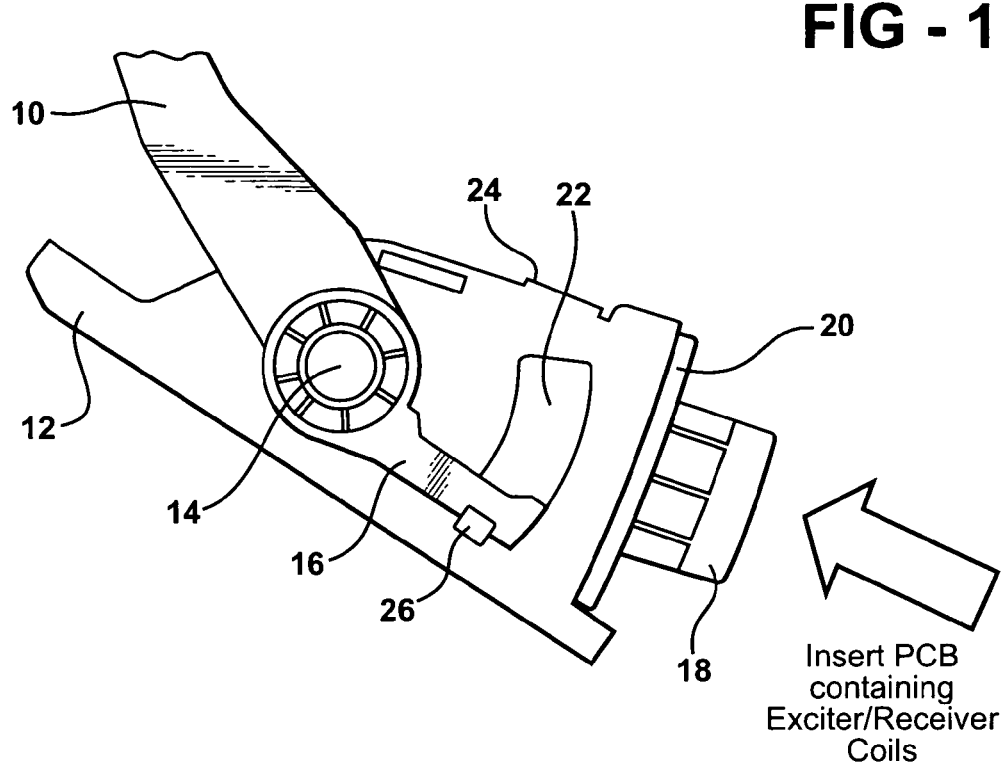
FIG. 1 illustrates a portion of a vehicle throttle control according to an example of the present invention.

FIG. 1 shows part of an apparatus for electronic throttle control of a vehicle. The apparatus comprises accelerator pedal arm 10, accelerator pedal housing 12, the pedal arm 10 being pivotally attached to the housing 12 through pedal attachment 14. The foot-contacting portion of the pedal arm is not shown, but in an automotive application the pedal arm 10 would extend in a generally downwards direction (to the left as illustrated here) and be terminated with a foot pedal depressed by a foot of the vehicle operator. The pedal arm has a pedal arm extension 16, the opposite side of the pedal pivot point from the foot pedal. A coupler element 22 is supported by a portion of the pedal arm 24, using coupler connection 26. As the pedal 10 is depressed by a vehicle operator, the coupler element will move in an anticlockwise direction in example illustrated in FIG. 1.

The accelerator pedal housing 12 has a circuit board holder 20 attached thereto, including a slot surrounded by a portion 18 of the circuit board holder. A circuit board is inserted into the slot, so that a transmitter coil and receiver coil supported on the circuit board are proximate to the coupler element 22. An electronic circuit is disposed on the circuit board, receiving the receiver signal from the receiver coil, performing any desired receiver signal processing, and providing an electrical throttle signal to an engine. Signal processing may also take place within the engine throttle control.

In this example, the coupler element is in the form of a metal plate, here viewed face on. The pedal arm rotates around a pedal rotation axis passing through the pedal attachment point 14, the figure being a section through a plane orthogonal to the pedal rotation axis. The coupler element is a plate also generally extending in a plane normal to the pedal rotation axis, and the pedal rotation axis is also a coupler element rotation axis about which the coupler element rotates as the pedal is depressed.

The coupler element rotates in a plane generally parallel to the circuit board, and hence generally parallel to the transmitter and receiver coils. One or more guides, such as an arcuate slot, may be provided to limit motion of the coupler element to the plane of the circuit board.

Figure 2:
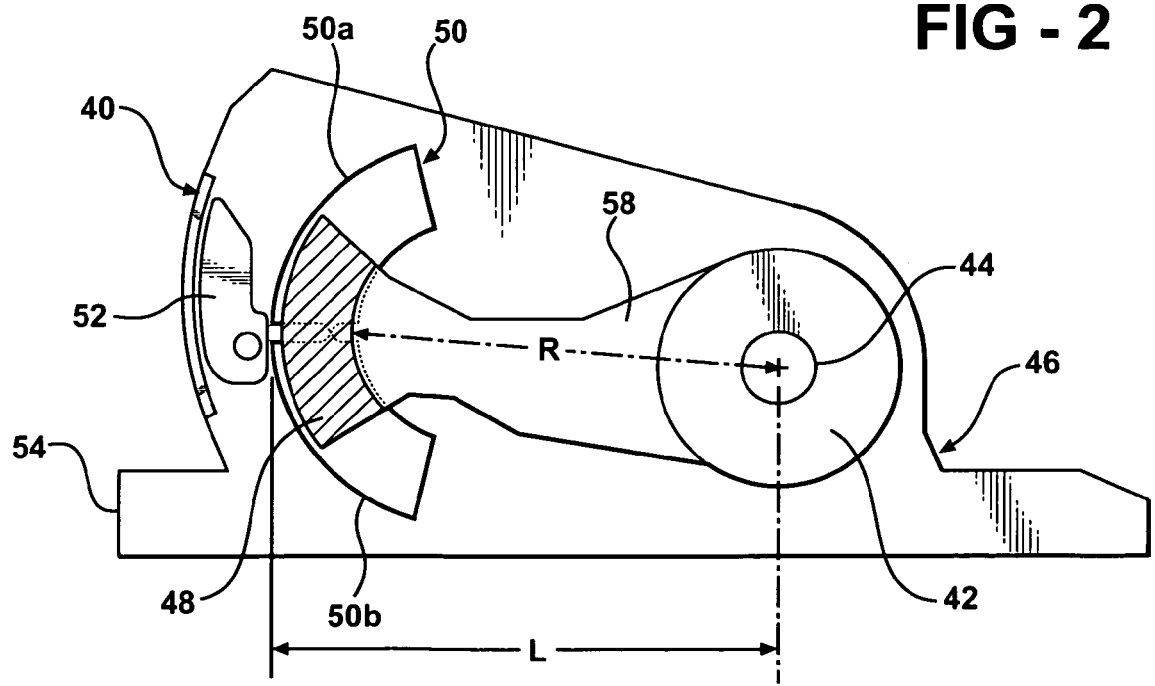
FIG. 2 show a schematic of a portion of a vehicle throttle control according to an example of the present invention.

FIG. 2 shows a schematic of an apparatus according to an example of the present invention, comprising pedal housing 46, the pedal housing having a friction surface 40 over which resistance element 52 of the pedal arm 58 moves. The pedal arm has pedal attachment point, in this case a pivot point 42. The remainder of the pedal arm is not shown for illustrative clarity. The pedal arm comprises a first or proximate portion, from the viewpoint of an operator, connecting the foot pedal and the pivot point, and a second or distal portion connecting the pivot point and the coupler element. A coupler element 48 is supported on distal end of the pedal arm.

The figure also shows schematically a receiver coil 50, having a first loop configuration 50*a* and a second loop configuration 50*b*. The first and second loop configurations are electrically interconnected by a cross-over connection, so that any current flowing clockwise in one loop configuration would flow anti-clockwise in the other loop configuration. The receiver coil may comprises one or more turns for each loop configuration, and can be tapped in any convenient location to provide the receiver signal output connections.

A transmitter coil, not shown, but which may be one or more turns in a coil of similar shape and size to the receiver coil, excites the receiver coil when the transmitter coil is energized by an alternating current source. The transmitter coil has an inductive coupling to the receiver coil. In the absence of the coupler element, the first and second loop configurations can be configured so that inductive coupling to the first loop configuration 50*a* and second loop configuration 50*b* induces substantially opposed voltages. The receiver signal amplitude is the difference between the amplitudes of a first signal induced in the first loop configuration and a second signal induced in the second loop configuration.

The coupler element modifies the inductive coupling between the transmitter coil and the receiver coil, and also modifies the relative strength of inductive coupling between the receiver coil and the first and second loop configurations. The first and second loop configurations have a degree of spatial separation, and the coupler element modifies the spatial distribution of inductive coupling between the transmitter coil and the receiver coil.

Referring again to FIG. 2, the coupler element is shown located in a position such that inductive coupling between the transmitter coil and the first and second loop configurations of the receiver coil are modified to similar degrees. As the coupler element moves clockwise (in the view illustrated in FIG. 2) so as to further block the inductive coupling between the transmitter coil and the first loop configuration 50*a*, the first signal decreases in amplitude and the second signal increases in amplitude. Hence, the amplitude of the receiver signal increases. The amplitude of the receiver signal also increases as the coupler element moves anticlockwise from the position shown in FIG. 2, but the receiver signal will have an opposite phase.

The figure shows distance R, the radius of rotation of the inner edge of the coupler element which may be equal to the radius of curvature of the inner edge of the transmitter coil, and a distance L, the length of a distal portion of the pedal arm.

Figure 3:
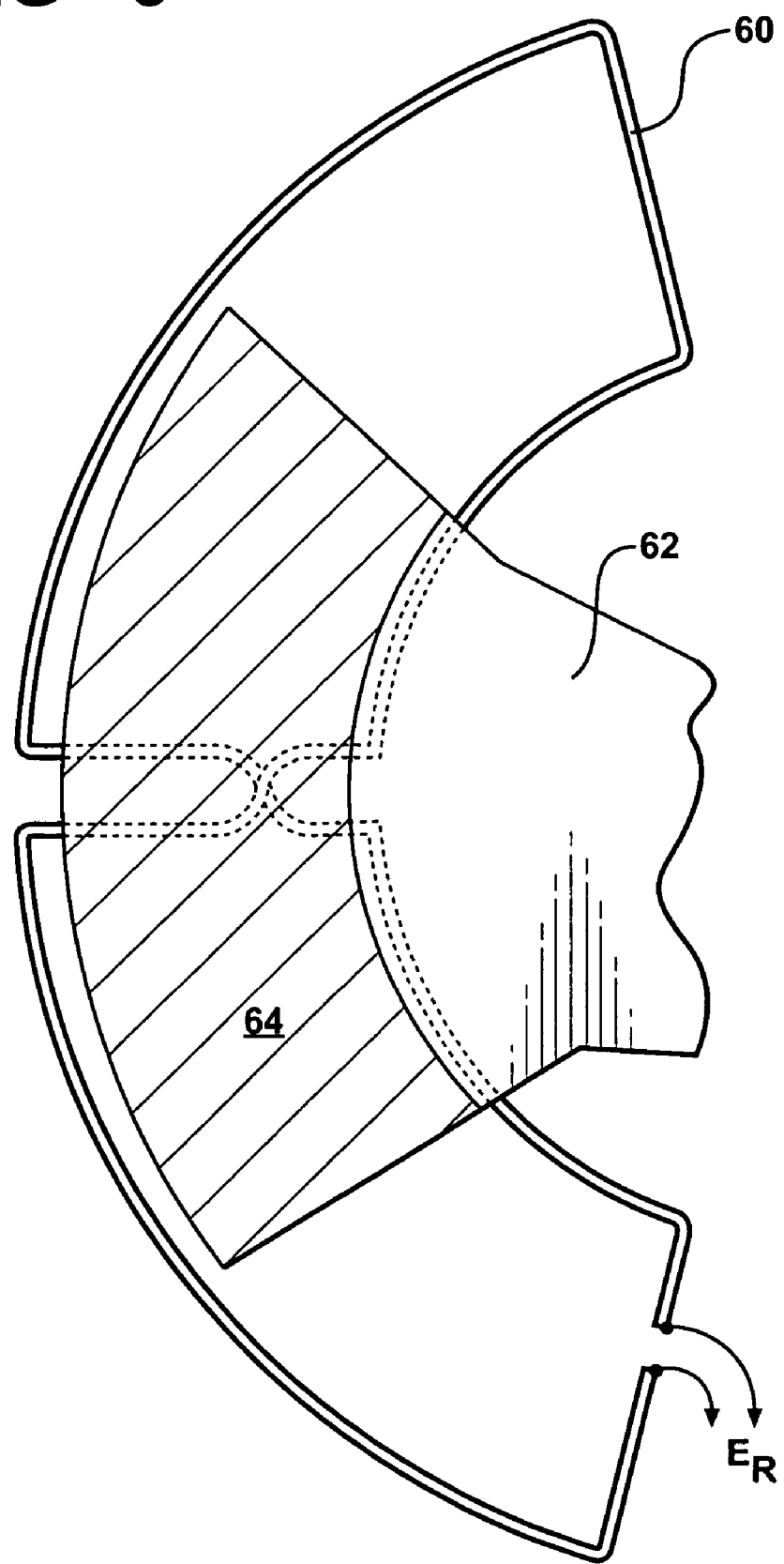
FIG. 3 further illustrates a possible configuration of receiver coil and coupler element.

FIG. 3 illustrates another view of a possible relationship between a coupler element 64, supported on part of a pedal arm 62, in relations to a receiver coil 62. $E_R$ represents the receiver signal.

In examples discussed above in relation to an accelerator pedal for a vehicle, depression of the accelerator pedal pivots the pedal arm around the pedal attachment point. From the viewpoint of a vehicle operator, the proximate end of the pedal arm supports a foot-contacting portion, often generally referred to as the accelerator or gas pedal. The distal end portion of the pedal arm is the portion of the pedal arm on the opposite side of the pedal attachment point, where the pedal is attached to the pedal housing.

In examples of the present invention, the coupler element is attached to the distal end of the pedal arm, and moves along an arc as the accelerator pedal is depressed. The accelerator pedal itself also describes an arc as it is depressed. The receiver coil includes first and second loop configurations, the first signal induced in the first loop configuration being of opposed phase to a second signal induced in the second loop configuration, for alternating current excitation of the transmitter coil. The first and second loop configurations have different spatial distributions, and may be separated spatially, or may overlap to some degree. The coupling element blocks a portion of the electromagnetic flux inductively coupling the transmitter coil and the receiver coil, and the flux blocking is also spatially non-uniform. Hence, movement of the coupling element can be detected from the relative contributions of the first and second signals within the first and second loop configurations to the receiver signal.

The motion of the coupling element need not be rotational. In other representative examples, the coupling element may have a linear motion, and for example be used with first and second loop configurations that are arranged as a linear sequence of turns. Similar examples may be used in push-pull throttle controls, for example hand-operated throttle controls. The coupling element may also have a motion that is a combination of linear and rotational motion.

In further examples of the present invention, a third coil may be provided as a reference coil. In further examples of the present invention, a reference coil, which may also be referred to as a differential dummy, is provided which provides a reference signal that is substantially independent of the position of the coupler element. However, the reference signal is susceptible to the same factors, which may be referred to generally as common mode factors, that influence the strength of the receiver signals. The common mode factors may include one or more of the following: coupler gap between the coupler element and the transmitter (or receiver) coil, variations in the excitation voltage applied to the transmitter coil, environmental electromagnetic fields inducing receiver noise, temperature variations, and the like. Reference coil configurations are more fully described in co-pending applications.

The reference coil, transmitter coil, and receiver coil can be supported on the same printed circuit board, which may be a multi-layer board. The board is received by a board holder, such as a slot, slots, indentation, mounting bracket, tabs, other mechanical attachments such as push-through posts, or other board holding mechanism. The pedal assembly may then include the pedal arm, pedal housing, and received circuit board. In this assembly, the relative positions of the transmitter coil, receiver coil, and (optional) reference coil are fixed, as all coils are supported by the same board. There may be some manufacturing variation which leads to a variable gap between the board and the coupler element. However, this can be compensated for by a calibration step, measurement, or use of a reference coil to generate a ratio signal, the ratio of the receiver signal and reference signal. The ratio signal is substantially independent of common mode factors equally influencing the reference and receiver signal, such as the gap between the board and the coupler element.

Examples of the present invention can be used in other engine speed control applications. In a generalized example, a control arm is used to control the engine speed of an engine. The control arm may be a foot-operated pedal, a hand-operated accelerator, a joystick, a slider control, a push/pull engine speed control (such as used in general aviation aircraft), or other control, movement of which is used by an operator to control engine speed. A coupler element is mechanically coupled to the control arm, for example attached to the control arm. The control arm can be mounted in a control arm housing, which can be a pedal housing if the control arm is a pedal. The transmitter and/or receiver coil may be contained within the control arm housing, or can be on a separate or other support structure that slots into or is otherwise received or disposed proximate to the control arm housing.

For example, engine speed controls according to examples of the present invention include boat engine speed controls, airplane engine speed controls, hand-operated controls for any kind of vehicle, and the like.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Prov. Pat. Apps. Ser. Nos. 60/561,065 filed Apr. 9, 2004; 60/561,007 filed Apr. 9, 2004; 60/598,192, filed Aug. 2, 2004, 60/669,145, filed Apr. 7, 2005, and 60/669,478, filed Apr. 8, 2005 are incorporated herein in their entirety.

Having described my invention, I claim:

1. An apparatus for allowing electronic control of an engine speed of an engine by an operator, the apparatus comprising:

a pedal arm, the pedal arm being pivotally attached to a pedal support at a pedal attachment point, the pedal arm having a pedal position;

a transmitter coil;

a receiver coil, providing a receiver signal due to an inductive coupling between the transmitter coil and the receiver coil when the transmitter coil is energized by an alternating current; and a coupler element having a coupler position, the coupler element being mechanically associated with the pedal arm so that the coupler position is correlated with the pedal position, the coupler element modifying the inductive coupling between the transmitter coil and the receiver coil so that the receiver signal is correlated with the pedal arm position, wherein the receiver coil includes a first loop configuration and a second loop configuration, inductive coupling from the transmitter coil inducing a first voltage in the first loop configuration and a second voltage in the second loop configuration, the first and second voltages being opposed, the first and second loop configurations being electrically interconnected by a cross-over connection, the cross-over connection being generally disposed along a radial direction relative to the pedal attachment point.

2. The apparatus of claim 1, wherein the pedal support is a pedal housing.

3. The apparatus of claim 2, wherein the transmitter coil and receiver coil are supported on a printed circuit board.

4. The apparatus of claim 3, wherein the pedal housing receives the printed circuit board so that the transmitter coil is proximate to the coupler element.

5. The apparatus of claim 1, wherein the transmitter coil and receiver coil are substantially coplanar.

6. The apparatus of claim 1, wherein the coupler element is a metal plate attached to the pedal arm, the metal plate describing a generally circular path around a pedal rotation axis as the pedal is depressed.

7. The apparatus of claim 1, the apparatus further comprising a reference coil, the reference coil providing a signal substantially independent of the coupler position.

8. The apparatus of claim 1, wherein the pedal arm has a first portion and a second portion, the first portion supporting a foot pedal depressible by the operator, the second portion supporting the coupler element, the pedal attachment point being located between the first portion and the second portion.

9. The apparatus of claim 8, wherein the coupler element is an electrically conducting plate, moving along a circular arc as the foot pedal is depressed, the circular arc being centered on the pedal attachment point, the receiver coil having a generally arcuate shape disposed along the circular arc.

10. An apparatus to assist electronic throttle control of an engine by an operator, the apparatus comprising;

a moveable pedal arm;

a pedal housing, supporting the moveable pedal arm at a pedal attachment point;

a coupler element, supported on the movable pedal arm, the coupler element having a coupler position responsive to movement of the moveable pedal arm; and a coil support structure supporting a transmitter coil and a receiver coil, the receiver coil providing a receiver signal when the transmitter coil is excited by an alternating current source due to an inductive coupling between the transmitter coil and the receiver coil, the inductive coupling between the transmitter coil and the receiver coil having a spatial distribution determined by the coupler position, the inductive coupling inducing opposed voltages in different portions of the receiver coil, wherein the receiver coil includes at least a first loop configuration and a second loop configuration, inductive coupling from the transmitter coil inducing a first voltage in the first loop configuration and a second voltage in the second loop configuration, the first and second voltages being opposesd, the first and second loop configurations being electrically interconnected by a cross-over connection, the cross-over connection being generally disposed along a radial direction relative to the pedal attachment point.

11. The apparatus of claim 10, wherein the receiver signal is a combination of a first voltage induced in a first loop structure of the receiver coil and a second voltage induced in a second loop structure of the receiver coil, the coupler position determining a ratio between the first voltage and the second voltage.

12. The apparatus of claim 10, wherein the planar support structure is a printed circuit board, the printed circuit board having the transmitter coil and receiver coil printed thereon.

13. The apparatus of claim 10, wherein the transmitter coil and the receiver coil are substantially coplanar.

14. The apparatus of claim 10, further comprising a reference coil, the reference coil providing a signal substantially independent of the coupler position.

\* \* \* \* \*

UNITED STATES PATENT AND TRADEMARK OFFICE
CERTIFICATE OF CORRECTION

| | | |
|---|---|---|
| PATENT NO. | : 7,191,759 B2 | Page 1 of 1 |
| APPLICATION NO. | : 11/102046 | |
| DATED | : March 20, 2007 | |
| INVENTOR(S) | : Joong K. Lee | |

It is certified that error appears in the above-identified patent and that said Letters Patent is hereby corrected as shown below:

Column 1, line 62, replace "can a metal" with -- can be a metal --

Column 2, line 24, replace "show" with -- shows --

Column 3, line 43, replace "comprises" with -- comprise --

Signed and Sealed this

Seventh Day of August, 2007

JON W. DUDAS
*Director of the United States Patent and Trademark Office*